US007774787B2

(12) United States Patent
Leino et al.

(10) Patent No.: US 7,774,787 B2
(45) Date of Patent: Aug. 10, 2010

(54) METHOD FOR SPECIFYING AND VERIFYING MULTI-THREADED OBJECT-ORIENTED PROGRAMS WITH INVARIANTS

(75) Inventors: K. Rustan M. Leino, Bellevue, WA (US); Wolfram Schulte, Bellevue, WA (US); Bart Jacobs, Leuven (BE)

(73) Assignee: Microsoft Corporation, Redmond, WA (US)

( * ) Notice: Subject to any disclaimer, the term of this patent is extended or adjusted under 35 U.S.C. 154(b) by 1460 days.

(21) Appl. No.: 11/041,014

(22) Filed: Jan. 11, 2005

(65) Prior Publication Data

US 2006/0155905 A1 Jul. 13, 2006

(51) Int. Cl.
G06F 9/46 (2006.01)
G06F 9/44 (2006.01)
G06F 3/00 (2006.01)

(52) U.S. Cl. .................. 718/107; 717/116; 719/316

(58) Field of Classification Search ............... 718/100, 718/107; 717/116, 131; 715/708, 762; 713/1; 712/209; 707/102; 705/1; 702/186, 189; 719/316

See application file for complete search history.

(56) References Cited

U.S. PATENT DOCUMENTS

| 5,613,122 | A | * | 3/1997 | Burnard et al. ............ 713/1 |
| 5,862,376 | A | * | 1/1999 | Steele et al. ............ 718/107 |
| 5,987,252 | A |   | 11/1999 | Leino et al. |
| 6,031,993 | A |   | 2/2000 | Andrews et al. |
| 6,070,008 | A |   | 5/2000 | Korenshtein |
| 6,081,665 | A | * | 6/2000 | Nilsen et al. ............ 717/116 |
| 6,149,318 | A | * | 11/2000 | Chase et al. ............ 717/131 |
| RE37,722 | E | * | 5/2002 | Burnard et al. ............ 713/1 |
| 6,401,182 | B1 |  | 6/2002 | Sweeney |
| 6,611,840 | B1 | * | 8/2003 | Baer et al. ............ 707/102 |
| 6,670,969 | B1 | * | 12/2003 | Halstead et al. ............ 715/762 |
| 6,925,638 | B1 |  | 8/2005 | Koved et al. |
| 7,024,661 | B2 |  | 4/2006 | Leino et al. |
| 7,111,233 | B1 |  | 9/2006 | Ballantyne et al. |
| 7,114,147 | B2 |  | 9/2006 | Ballantyne et al. |
| 7,120,902 | B2 |  | 10/2006 | Flanagan et al. |
| 7,168,071 | B2 |  | 1/2007 | Wu et al. |

(Continued)

OTHER PUBLICATIONS

Bachmair et al., "Abstract congruence closure and specializations," Conference on Automated Deduction, CADE 2000, vol. 1831, pp. 64-78 (Jun. 2000).

(Continued)

*Primary Examiner*—Meng-Ai An
*Assistant Examiner*—Nikhil Krishnan
(74) *Attorney, Agent, or Firm*—Klarquist Sparkman, LLP

(57) ABSTRACT

Various new and non-obvious systems and methods for ensuring within a multi-threaded environment that object fields hold legal values are disclosed. One of the disclosed embodiments is a method for a thread locking the top object of an object hierarchy. The thread then gains ownership of the locked object and any children of the locked object, by successively unpacking child objects, allowing the thread to write to any unpacked object field. By owning the top hierarchical object, the thread also achieves transitive ownership to any descendants of the object, allowing the thread to read any object fields which it transitively owns. When a thread locks an object within this exemplary embodiment all other threads are denied access to the locked object and to any descendants of the locked object.

15 Claims, 11 Drawing Sheets

U.S. PATENT DOCUMENTS

| | | | |
|---|---|---|---|
| 7,289,964 B1* | 10/2007 | Bowman-Amuah | 705/1 |
| 7,346,844 B1* | 3/2008 | Baer et al. | 715/708 |
| 2001/0014905 A1* | 8/2001 | Onodera | 709/102 |
| 2001/0044931 A1 | 11/2001 | Kyushima et al. | |
| 2002/0046393 A1 | 4/2002 | Leino et al. | |
| 2002/0112201 A1 | 8/2002 | Flanagan et al. | |
| 2002/0120428 A1* | 8/2002 | Christiaens | 702/186 |
| 2002/0133806 A1 | 9/2002 | Flanagan et al. | |
| 2003/0131284 A1 | 7/2003 | Flanagan et al. | |
| 2004/0060041 A1 | 3/2004 | Demsey et al. | |
| 2005/0066319 A1 | 3/2005 | DeLine et al. | |
| 2006/0143429 A1* | 6/2006 | Nishiyama et al. | 712/209 |
| 2006/0206883 A1 | 9/2006 | Sabbouh | |
| 2006/0225034 A1 | 10/2006 | Peck et al. | |
| 2006/0230392 A1 | 10/2006 | Duale et al. | |
| 2006/0248518 A1 | 11/2006 | Kundert | |
| 2007/0089103 A1 | 4/2007 | Iborra et al. | |
| 2007/0271562 A1* | 11/2007 | Schumacher et al. | 718/100 |
| 2008/0295079 A1 | 11/2008 | Yiftachel et al. | |

OTHER PUBLICATIONS

Blanchet et al., "A Static Analyzer for Large Safety-critical Software," PLDI 2003, 12 pp., Jun. 9-11, 2003.

Burdy et al., "An Overview of JML Tools and Applications," International Journal on Software Tools for Technology Transfer, 13 pages (2005).

Chang et al., "Abstract Interpretation with Alien Expressions and Heap Structures," Technical Report MSR-TR-2004-115, 27 pp. (Jan. 2005).

Chang et al., "Inferring Object Invariants," AIOOL, 11 pages, 2005.

Cousot et al., "Abstract interpretation: a unified lattice model for static analysis of programs by construction or approximation of fixpoints," Conf. Record of the Fourth Annual ACM Symposium on Principles of Programming Languages, pp. 238-252 (Jan. 1977).

Cousot et al., "Automatic discovery of linear restraints among variables of a program," Conference Record of the Fifth Annual ACM Symposium on Principles of Programming Languages, pp. 84-96 (Jan. 1978).

Cousot et al., "Systematic design of program analysis frameworks," Sixth POPL, pp. 269-282 (Jan. 1979).

Das, "Unification-based Pointer Analysis with Directional Assignments," PLDI 2000, pp. 35-46.

DeLine et al., "Typestates for Objects," Proc. European Symp. on Object Oriented Programming, 26 pp. (2004).

Deutsch, "Static Verification of Dynamic Properties," Polyspace Technologies, Inc., 8 pp. (Nov. 2003).

"Fugue—Protocol checking for .NET code," 1 page (downloaded from the World Wide Web on Aug. 9, 2005).

Fahndrich et al., "Adoption and Focus: Practical Linear Types for Imperative Programming," 11 pp. (2002).

Gulwani et al., "Join algorithms for the theory of uninterpreted functions," Proceedings of the 24th Conference on Foundations of Software Technology and Theoretical Computer Science, 12 pp. (Dec. 2004).

Hoare et al., "An axiomatic definition of the programming language PASCAL," Acta Informatica, vol. 2, No. 4, pp. 335-355 (1973).

Hote et al., "Run-Time Error Detection through Semantic Analysis: A Breakthrough Solution to Today's Software Testing Inadequacies," Polyspace Technologies, Inc., 10 pp. (Sep. 2001).

Hudak et al., Collecting Interpretations of Expressions, ACM, ACM Transactions on Programming Languages and Systems, vol. 13, No. 2, pp. 269-290, Apr. 1991.

Jones et al., "Flow analysis and optimization of Lisp-like structures," in Program Flow Analysis: Theory and Applications, Ch. 4, pp. 102-131 (1981).

Lahiri, S. K., "Unbounded System Verification Using Decision Procedure and Predicate Abstraction," Ph.D. thesis, Carnegie Mellon University, 273 pp. (Sep. 2004).

Leino, "Toward Reliable Modular Programs," Ph.D. Thesis, California Institute of Technology, 183 pp. (1995) (available as Technical Report Caltech-CS-TR-95-03).

Lev-Ami et al., "Putting static analysis to work for verification: A case study," International Symposium on Software Testing and Analysis, pp. 26-38 (2000).

Logozzo, F., "Class-level Modular Analysis for Object Oriented Languages," SAS 2003, pp. 37-54.

Logozzo, "Separate compositional analysis of class-based object-oriented languages," Proc. of the 10th Int'l Conf. on Algebraic Methodology and Software Technology, vol. 3116, pp. 332-346 (Jul. 2004).

McCarthy et al., "Correctness of a compiler for arithmetic expressions," Proceedings of Symposia in Applied Mathematics, 11 pp. (1967).

Meyer, B., "Object-oriented Software Construction," Series in Computer Science, Prentice-Hall International, 82 pp., 1988.

Nelson, "A generalization of Dijkstra's calculus," ACM Trans. on Programming Languages and Systems, vol. 11, No. 4, pp. 517-561 (Oct. 1989).

Nelson et al., "Simplification by cooperating decision procedures," Stanford Artificial Intelligence Laboratory Memo AIM-3 11, 21 pp. (Apr. 1978).

Poetzsch-Heffter, "Specification and verification of object-oriented programs," Habilitationsschrift, Technische Universität München, 162 pp. (1997).

Sagiv et al., "Parametric shape analysis via 3-valued logic," ACM Transactions on Programming Languages and Systems, vol. 24, No. 3, pp. 217-298 (2002).

Steensgaard, B., "Points-to Analysis in Almost Linear Time," 23rd POPL (1995), pp. 1-10.

Stransky, "A lattice for abstract interpretation of dynamic (LISP-like) structures," Inf. Comput., vol. 101, No. 1, pp. 70-102 (1992).

"Vault—a programming language for reliable systems," 47 pp. (printouts of pp. from the World Wide Web, downloaded on Aug. 9, 2005).

Venet et al., "Precise and Efficient Static Array Bound Checking for Large Embedded C Programs," PLDI 2004, pp. 231-242.

Yi et al., "Automatic generation and management of interprocedural program analyses," ACM, pp. 246-259, 1993.

Doug Lea, *Concurrent Programming in Java*, Addison Wesley, 2000.

Erika Abrahám-Mumm, Frank S. de Boer, Willem-Paul de Roever, and Martin Steffen. "Verification for Java's reentrant multithreading concept," In *Foundations of Software Science and Computation Structures, 5th International Conference, FoSSaCS 2002*, vol. 2303 of *Lecture Notes in Computer Science*, pp. 5-20, Springer, Apr. 2002.

Mike Barnett, Robert DeLine, Manuel Fähndrich, K. Rustan M. Leino, and Wolfram Schulte, "Verification of object-oriented programs with invariants," *Journal of Object Technology*, 3(6):27-56, 2004.

Mike Barnett, K. Rustan M. Leino, and Wolfram Schulte, "The Spec# programming system: An overview," In *Construction and Analysis of Safe, Secure and Interoperable Start devices (CASSIS)*, Lecture Notes in Computer Science, Springer, 2004.

Mike Barnett and David Naumann, "Friends need a bit more: Maintaining invariants over shared state," In Dexter Kozen, editor, *Mathematics of Program Construction*, Lecture Notes in Computer Science, pp. 54-84, Springer, Jul. 2004.

Chandrasekhar Boyapati, Robert Lee, and Martin Rinard, "Ownership types for safe programming: Preventing data races and deadlocks," In *Proceedings of the 2002 ACM SIGPLAN Conference on Object-Oriented Programming Systems, Languages and Applications, OOPSLA 2002*, vol. 37, No. 11 in *SIGPLAN Notices*, pp. 211-230, ACM, Nov. 2002.

Robert DeLine and Manuel Fähndrich, "Enforcing high-level protocols in low-level software," In *Proceedings of the 2001 ACM SIGPLAN Conference on Programming Language Design and Implementation (PLDI)*, vol. 36, No. 5 in *SIGPLAN Notices*, pp. 59-69, ACM, Jun. 2001.

David L. Detlefs, K. Rustan M. Leino, Greg Nelson, and James B. Saxe, "Extended static checking," Research Report 159, Compaq Systems Research Center, Dec. 1998.

Cormac Flanagan and Stephen N. Freund. Atomizer: A dynamic atomicity checker for multithreaded programs. In *Proceedings of the 2004 ACM SIGPLAN-SIGACT Symposium on Principles of Programming Languages (POPL 2004)*, vol. 39, No. 1 in *SIGPLAN Notices*, pp. 256-267, ACM, Jan. 2004.

Cormac Flanagan, K. Rustan M. Leino, Mark Lillibridge, Greg Nelson, James B. Saxe, and Raymie Stata. Extended static checking for Java. In *Proceedings of the 2002 ACM SIGPLAN Conference on Programming Language Design and Implementation (PLDI)*, vol. 37, No. 5 in *SIGPLAN Notices*, pp. 234-245, ACM, May 2002.

Stephen N. Freund and Shaz Qadeer. Checking concise specifications for multithreaded software, *Journal of Object Technology*, 3(6):81-101, Jun. 2004.

C. A. R. Hoare. Monitors: An operating system structuring concept, *Communications of the ACM*, 17(10):549-557, Oct. 1974.

K. Rustan M. Leino and Peter Müller, "Modular verification of global module invariants in object-oriented programs," Technical Report 459, ETH Zürich, 2004.

K. Rustan M. Leino and Peter Müller, "Object invariants in dynamic contexts," In Martin Odersky, editor, *European Conference on Object-Oriented Programming (ECOOP)*, vol. 3086 of *Lecture Notes in Computer Science*, pp. 491-516, Springer-Verlag, 2004.

Jeremy Manson and William Pugh, "Requirements for programming language memory models," Workshop on Concurrency and Synchronization in Java Programs, in association with PODC, Jul. 2004.

Peter Müller, "*Modular Specification and Verification of Object-Oriented Programs*," vol. 2262 of *Lecture Notes in Computer Science*. Springer-Verlag, Oct. 8, 2001. PhD thesis, FernUniversität Hagen.

James Noble, Jan Vitek, and John Potter, "Flexible alias protection," In Eric Jul, editor, *ECOOP'98—Object-oriented Programming: 12th European Conference*, vol. 1445 of *Lecture Notes in Computer Science*, pp. 158-185, Springer, Jul. 1998.

S. S. Owicki and D. Gries, "An axiomatic proof technique for parallel programs," *Acta Informatica*, 6:319-340, 1976.

Shaz Qadeer, Sriram K. Rajamani, and Jakob Rehof, "Summarizing procedures in concurrent programs," In *Proceedings of the 2004 ACM SIGPLAN-SIGACT Symposium on Principles of Programming Languages (POPL 2004)*, vol. 39, No. 1 in *SIGPLAN Notices*, pp. 245-255, ACM, Jan. 2004.

Stefan Savage, Michael Burrows, Greg Nelson, Patrick Sobalvarro, and Thomas E. Anderson, "Eraser: A dynamic data race detector for multi-threaded programs," *ACM Transactions on Computer Systems*, 15(4):391-411, Nov. 1997, Also appears in *Proceedings of the Sixteenth ACM Symposium on Operating System Principles*, pp. 27-37, Operating System Review 31(5), 1997.

\* cited by examiner

```
public class DataRace {
    private static int S_count = 0 ;
    public void IncrCount() {
        int x := S_count ;
        S_count := x + 1 ;
    }
    public static void main(String args[] ) {
        Thread t1 := new IncrCount() ;
        Thread t2 := new IncrCount() ;
        t1.start () ;
        t2.start () ;
    }
}
```

605 → class Account {
607 →     rep IntList hist := new IntList() ;
          int bal := 0 ;
610 →     invariant bal =
          ($\sum i \mid 0 \leq i <$ hist.count • hist.elems$[i]$);

615 →     void Deposit(int amount)
620 →         requires owner = tid ^ inv ;
623 →         ensures bal = old(bal) + amount ;
          {
625 →         unpack (this) ;
627 →         hist.Add(amount) ;
              bal := bal + amount ;
630 →         pack (this) ;
          }
      }

635 → class Bank {
637 →     static void Transfer(Account from,
                              Account to,
                              int amount)
640 →         requires from ≠ null ^ to ≠ null ^ from ≠ to ^
                       from.owner = tid ^ to.owner = tid ;
645 →         ensures from.bal = old(from.bal) - amount ^
                      to.bal = old(to.bal) + amount ;
          {
650 →         from.Deposit(-amount) ;
655 →         to.Deposit(amount) ;
          }
      }

FIG.6

```
       class IntList {
705 →    rep int[ ] elems := new int[10] ;
710 →    int count := 0 ;
715 →         invariant 0 ≤ count ^ count ≤
                  elems.Length ;

720 →    void Add(int elem)
725 →         requires owner = tid ^ inv ;
         {
730 →      unpack (this) ;
           if (count = elems.Length)
               { elems := elems.Copy(count * 2) ;
           }
735 →      elems[count ] := elem ;
740 →      count := count + 1 ;
745 →      pack (this) ;
         }
       }
```

905 → class Bank {
  static void Transfer(Account from,
         Account to,
         int amount)

910 →   requires from ≠ null ^ to ≠ null ^ from ≠ to ^
    from.owner = tid ^ to.owner = tid ;

915 →   ensures from.bal = old(from.bal) - amount ^
    to.bal = old(to.bal) + amount ;
  {
    from.Deposit(-amount) ;
    to.Deposit(amount) ;
  }

930 →   static void Transaction(
         Account from,
         Account to,
         int amount)
    requires from ≠ null ^ to ≠ null ^ from ≠ to ;
  {
    acquire from ;
    acquire to ;
    Transfer(from, to, amount) ;

935 →     release to ;
940 →     release from ;
  }
}

FIG. 9 public class AcqRel {
  private boolean free ;
  public final synchronized void
acquire()
  { while (!free) { wait() ; } free = false ;
}
public final synchronized void release()
  { free = true ; notify() ; }
}

FIG. 10

METHOD FOR SPECIFYING AND VERIFYING MULTI-THREADED OBJECT-ORIENTED PROGRAMS WITH INVARIANTS

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates generally to program checking tools that minimize potential unwanted interference among concurrent threads. The present invention relates particularly to a way to structure multi-thread object-oriented programs to guarantee that only one thread at a time can access an object.

BACKGROUND

A primary aim of a reliable software system is ensuring that all objects in the system maintain consistent states; that is, states in which all fields of an object, and all fields of other objects upon which it depends, contain legal, meaningful values. If an object contains only legal values, it is considered to maintain invariancy. It is difficult to maintain invariants in sequential programs, as an object invariant may temporarily be violated during the update of an object's data, and any method call performed during this time may potentially cause control to re-enter the object's public interface where the object invariant is expected to hold.

It is even harder in concurrent object-oriented programs. For example, consider a system where for all dual accounts, account a and account b are to sum to the value zero. Consider the code fragment shown below:

```
void Transfer(DualAccounts o, int amount) {
    o.a := o.a - amount;
    o.b := o.b + amount;
}
```

In a sequential setting, this code maintains the invariant. However, in a system where more than one thread is running concurrently, the invariant condition (a+b=0) can be violated. It is not possible for a program to change the values in o.a and o.b simultaneously, which allows for the possibility of invariant violation, and can also lead to inconsistent program behavior. Such inconsistencies are known as dataraces. A datarace occurs in an execution of a program where there are conflicting actions in multiple threads when the actions are not explicitly ordered.

One method to ensure invariancy is to guarantee that an individual update is atomic. That is, each update will be performed with no other code updates on other threads occurring until the operation is complete. This ensures that the value of o.a, for example, will not be changed while the line of code o.a:=o.a−amount is being processed. This is insufficient to prevent the invariancy from being violated, as an update to a or b could occur on a different thread between the subtraction and the addition steps.

For example, FIG. 1A shows a program that starts two instances (t1 and t2) of code designed to increment a global counter S_count by 1. FIG. 1B shows the code executed (on two threads) the way the programmer expected; statements 1, 2, 3, and 4 are executed in order, with the result that the counter S_count is incremented as envisioned. In FIG. 1C, the second instantiation of IncrCount is interleaved between the two lines of code in the first instantiation with the effect that the value of x in t1 is not changed after its value is stored at line "1" of code in FIG. 1, when it is read by t2. So, the counter S_count is incremented only once after both t1 and t2 have run; leaving the value of S_count at "1", rather than the expected "2".

One method used to ensure internal consistency in a multi-threaded environment is by enforcing atomicity of concurrent operations at a level coarser than individual reads and writes. Commonly, the objects being updated are locked using mutexes. The following procedure will ensure that, for the Transfer function below, invariancy would be maintained:

```
void Transfer(DualAccounts o, int amount) {
    Lock Mutex for o.a
    Lock Mutex for o.b
    o.a:=o.a - amount;
    o.b:=o.b + amount;
    Unlock Mutex for o.a
    Unlock Mutex for o.b
}
```

However, mutex locks are expensive in terms of CPU time, and can cause other problems—such as starvation conditions, deadlocks, and race conditions; all of which can be very difficult to locate and debug, dependent as they are on very specific thread-statement ordering, such as that shown in FIG. 1C.

Extended Static Checkers for Modula-3 and for Java attempt to statically find errors in object-oriented programs. These tools include support for the prevention of dataraces and deadlocks. For each field, a programmer can designate which lock protects it. However, these two tools trade soundness for ease of use; for example, they do not take into consideration the effects of other threads between regions of exclusion. Moreover, various engineering trade-offs in the tools notwithstanding, the methodology used by the tools was never formalized enough to allow a soundness proof.

SUMMARY

As described herein, a way to structure multi-thread object-oriented programs, which guarantees the absence of dataraces, is provided. The various techniques and tools can be used in combination or independently. The disclosed exemplary apparatus and methods should not be construed as limiting in any way. Instead, the present disclosure is directed toward novel and non-obvious features and aspects of the various disclosed embodiments, alone and in various combinations and subcombinations with one another. The methods are not limited to any specific aspect, feature, or combinations thereof, nor do the disclosed methods require that any one or more specific advantages be present or problems be solved.

One implementation comprises executing multiple threads on a computer; a specific thread t1 acquiring a lock on a top hierarchical object. Once an object is acquired, it can be unpacked, which changes ownership of the object to the thread t1. Only when a thread owns an object can it change any of the object's fields. When the thread acquires a lock on the top object all other threads are excluded from accessing the top object and any descendant objects.

In an exemplary embodiment, an object may be owned by either a thread, another object, or is free. The method may also comprise an invariant, where the invariant comprises legal values for at least two fields in two different objects. An object field may temporarily violate the invariant.

In some instances, if thread t1 owns the top object of an object hierarchy then thread t1 transitively owns all descendants of the top object and if thread t1 transitively owns an object then the method allows the thread t1 to read at least one object field from at least one descendant object; The thread t1 acquires ownership of a child object with a parent by unpacking the parent of the child object.

In another embodiment, which ensures that there are no dataraces between first and second unordered memory accesses within a multi-threaded program, a first and second memory access request must be owned by a single thread prior to performing the memory access requests. Owning, in this context, comprises the thread owning a common ancestor of objects requesting the memory accesses. These memory accesses may be at different memory locations, they may be declared as modified variables, and they may be declared as preconditions or postconditions in a routine in a computer program.

In a system implementation, the system comprises one thread with a thread table for determining object ownership. The system further comprises at least two objects hierarchically arranged. Each object may further consist of an owner field, which is used to determine the entity that owns the object, and at least one variable field. The system further consists of an object invariant condition which states legal values for the at least one variable field of at least one object; and a thread-object consistency module, which ensures that for each thread-object transition, the thread table indicates that the thread owns the new owned object and the object owner field indicates that the object is owned by the new owner thread. A writer module, which writes a value into the object variable field if the object is owned by the thread requesting write access, may also be present. This embodiment may also contain an invariant checker, which ensures that the object variable field contains the invariant condition legal values, and which is called after the writer module is accessed for a given object.

Additional features and advantages will be made apparent from the following detailed description of various embodiments that proceeds with reference to the accompanying drawings.

BRIEF DESCRIPTION OF THE DRAWINGS

FIG. 6 is an example of exemplary programming code that illustrates some of the methods depicted herein.

FIG. 7 is an example of exemplary programming code that illustrates some of the methods depicted herein.

FIG. 9 is an example of exemplary programming code that illustrates some of the methods depicted herein.

FIG. 10 is an example of Java code that illustrates a sample implementation of an acquire and release statement.

DETAILED DESCRIPTION OF THE INVENTION

Computing Environment

Figures 1A, 1B, 1C:
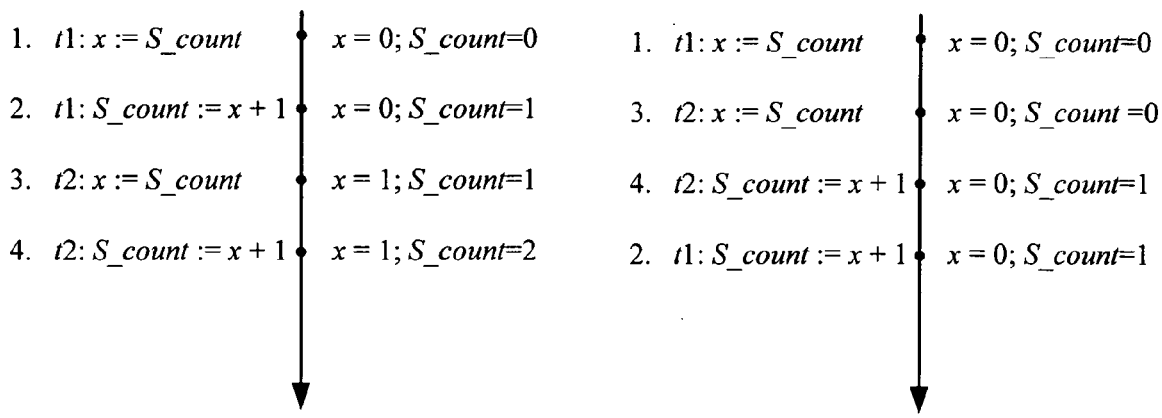
FIG. 1A is a prior art drawing of a code snippet with a potential datarace condition.
FIG. 1B is a drawing of a possible thread execution state of the code in FIG. 1A where the thread sequencing of operations is as expected.
FIG. 1C is a drawing of a possible thread execution state of the code in FIG. 1A where the thread sequencing of operations leads to incorrect results.
Figure 2:
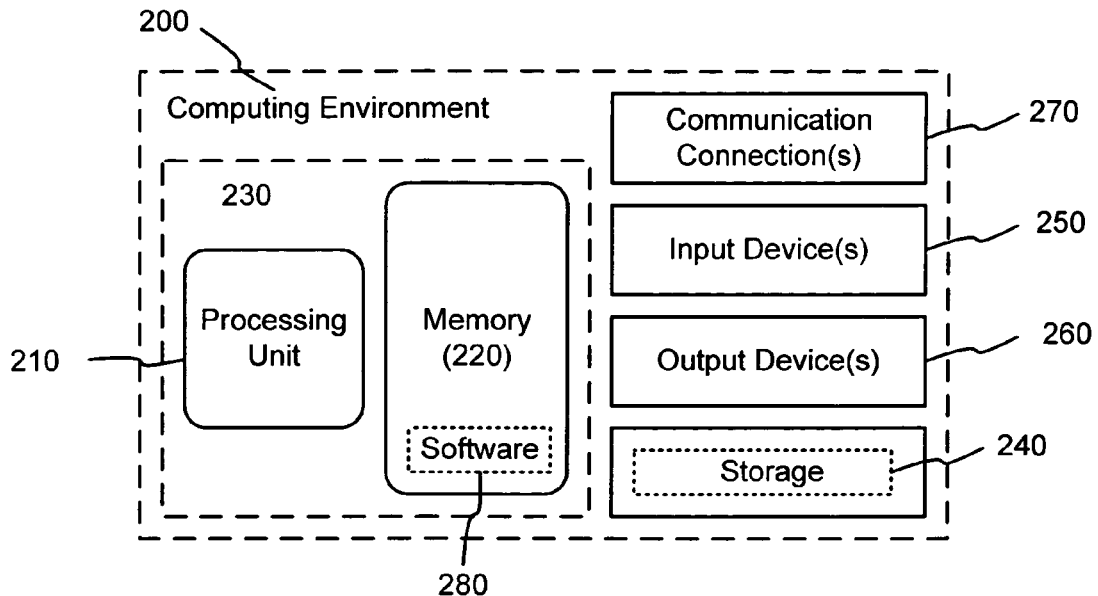
FIG. 2 is a block diagram of a computer system.

FIG. 2 illustrates a generalized example of a suitable computing environment 200 in which several of the described embodiments may be implemented. The computing environment 200 is not intended to suggest any limitation as to the scope of use or functionality, as the techniques and tools may be implemented in diverse general-purpose or special-purpose computing environments.

With reference to FIG. 2, the computing environment 200 includes at least one processing unit 210 and memory 220. This most basic configuration 230 is included within a dashed line. The processing unit 210 executes computer-executable instructions and may be a real or a virtual processor. In a multi-processing system, multiple processing units execute computer-executable instructions to increase processing power. The memory 220 may be volatile memory (e.g., registers, cache, RAM, etc.), non-volatile memory (e.g., ROM, EEPROM, flash memory, etc.), or some combination of the two. The memory 220 stores software 280 implementing a method and apparatus to aid in the verification of multi-threaded programs with invariants.

A computing environment may have additional features. For example, the computing environment 200 includes storage 240, one or more input devices 250, one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, DVDs, or any other medium which can be used to store information and which can be accessed within the computing environment 200. The storage 240 stores instructions for the software 280 implementing the mechanisms to aid in the verification of multi-threaded object-oriented programs with invariants.

The input device(s) 250 may be a touch input device, such as a keyboard, mouse, pen, or trackball, a voice input device, a scanning device, or another device that provides input to the computing environment 200. For audio or video encoding, the input device(s) 250 may be a sound card, video card, TV tuner card, or similar device that accepts audio or video input in analog or digital form, or a CD-ROM or CD-RW that reads audio or video samples into the computing environment 200. The output device(s) 260 may be a display, printer, speaker, CD-writer, or another device that provides output from the computing environment 200.

The communication connection(s) 270 enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 200, computer-readable media include memory 220, storage 240, communication media, and combinations of any of the above.

The techniques and tools can be described in the general context of computer-executable instructions, such as those included in program modules, being executed in a computing environment 200 on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment 200.

If desired, the technologies described herein (i.e. verifying multi-threaded programs with invariants) can be provided as part of a program verification service. Programs interacting with the service can thus take advantage of the features as desired.

The various technologies described herein are useful to ensure that invariant values are preserved within a computer program.

For illustration purposes, invariants are discussed in terms of routines which are defined sections of code; an idea that encompasses functions, procedures, and other forms of code modulization as well. The examples given should be considered to be written in pseudo-code. It should be appreciated by those of skill in the art that the embodiments shown are not limited to any specific programming language.

Overview

In an exemplary embodiment, the data within a multi-threaded program is structured such that each object is either owned by a thread, owned by an object, or is free. Each thread has an ownership domain, which are the objects that the thread either owns or transitively owns. If an object is at the top of a hierarchy, it is either owned by a thread or is free. If a thread owns an object then it can change its values. It is understood that this embodiment can be used in a mixed environment; that is, there may be other ways for a thread to change the values of an object.

Data races are prevented in our methodology by 1) requiring that a thread own an object when it accesses one of its fields, and 2) ensuring that at no point during the execution do two threads own the same object. Therefore, two accesses by different threads of fields of the same object cannot occur concurrently (i.e. not-ordered) since this would mean that both threads own this object at the same time.

Figure 4A:
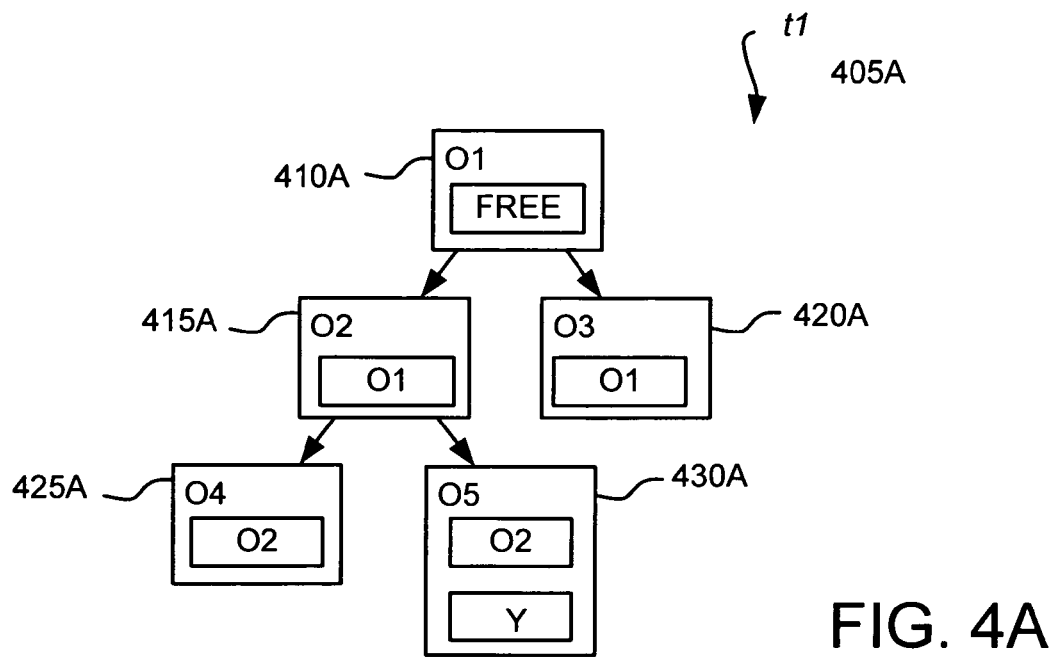
FIG. 4A is a diagram illustrating the concept "owns" using a portion of an exemplary structure of a hierarchy of objects and a thread.
Figure 4B:
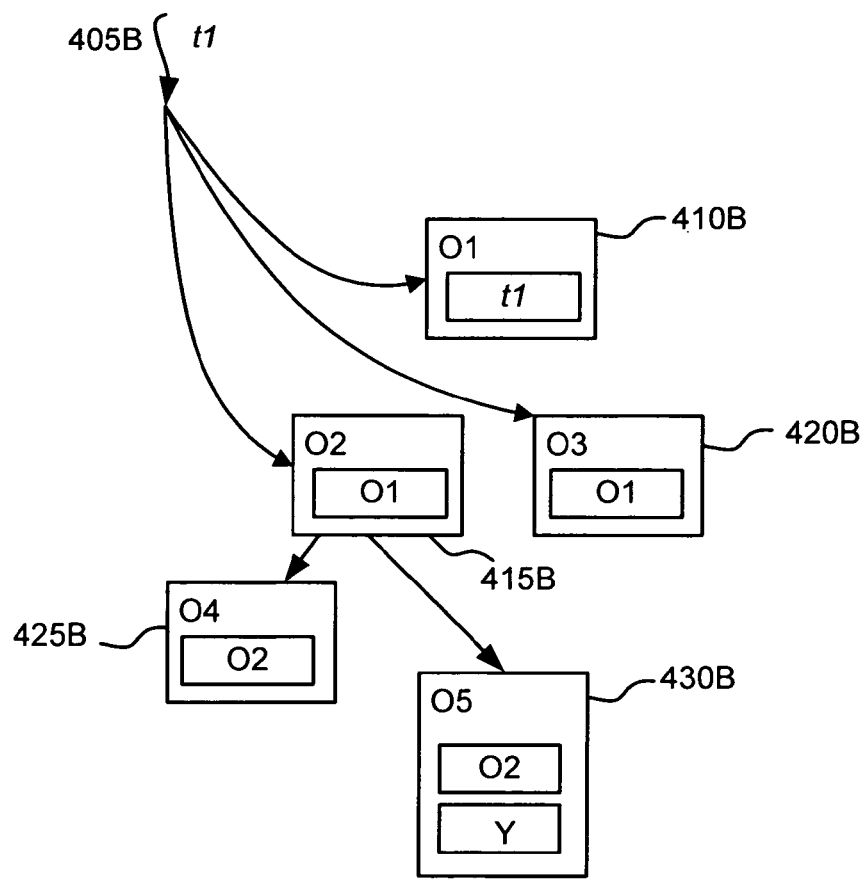
FIG. 4B is a diagram further illustrating an embodiment using an example of an exemplary structure of a hierarchy of objects and a thread which owns a portion of the objects.
Figure 4C:
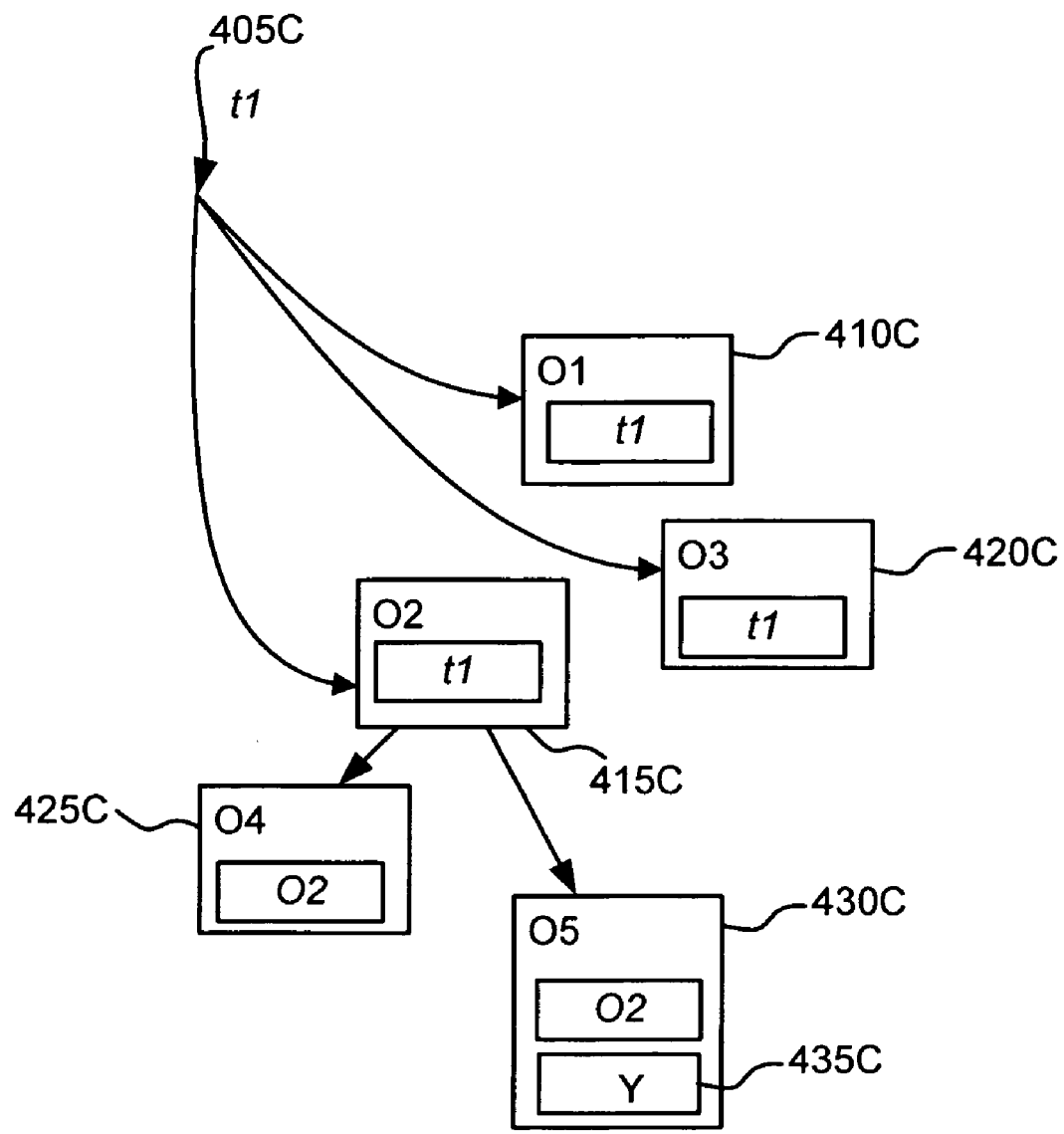
FIG. 4C is a diagram further illustrating an embodiment using an example of an exemplary structure of a hierarchy of objects and a thread which owns some of the objects.

This relationship is shown in FIG. 4A. Thread t1 at 405A does not currently own any object. Object O1 at 410A is free—it is not owned by any thread. Object O1 is at the top of a hierarchy of objects, having as children O2 at 415A and O3 at 420A, which are owned by object O1 at 410A. O2 at 415A, has, in turn, children O4 at 425A and O5 at 430A, which are owned by O2 at 415A. In FIG. 4B, the thread t1 at 405B has now locked object O1 at 410B. In FIG. 4C, t1 at 410C has unpacked its owned object O1 and, by doing so, has gained control of O1's children O2 at 415C and O3 at 420C. At this stage, t1 can modify the object fields of all of the objects it owns; O1, O2, and O3. O2's children O4 at 425C and O5 at 430C are still owned by O2 at 415C. Even though t1 does not directly own them, the thread does transitively own the objects because it owns a direct ancestor of them. A thread can read the values of any object that it transitively owns, so at this stage, t1 can read the value stored in object O5's Y field 435C. Thread t1's 405C ownership domain consists of objects O1 through O5 (410C, 415C, 420C, 425C, and 430C).

Figure 4D:
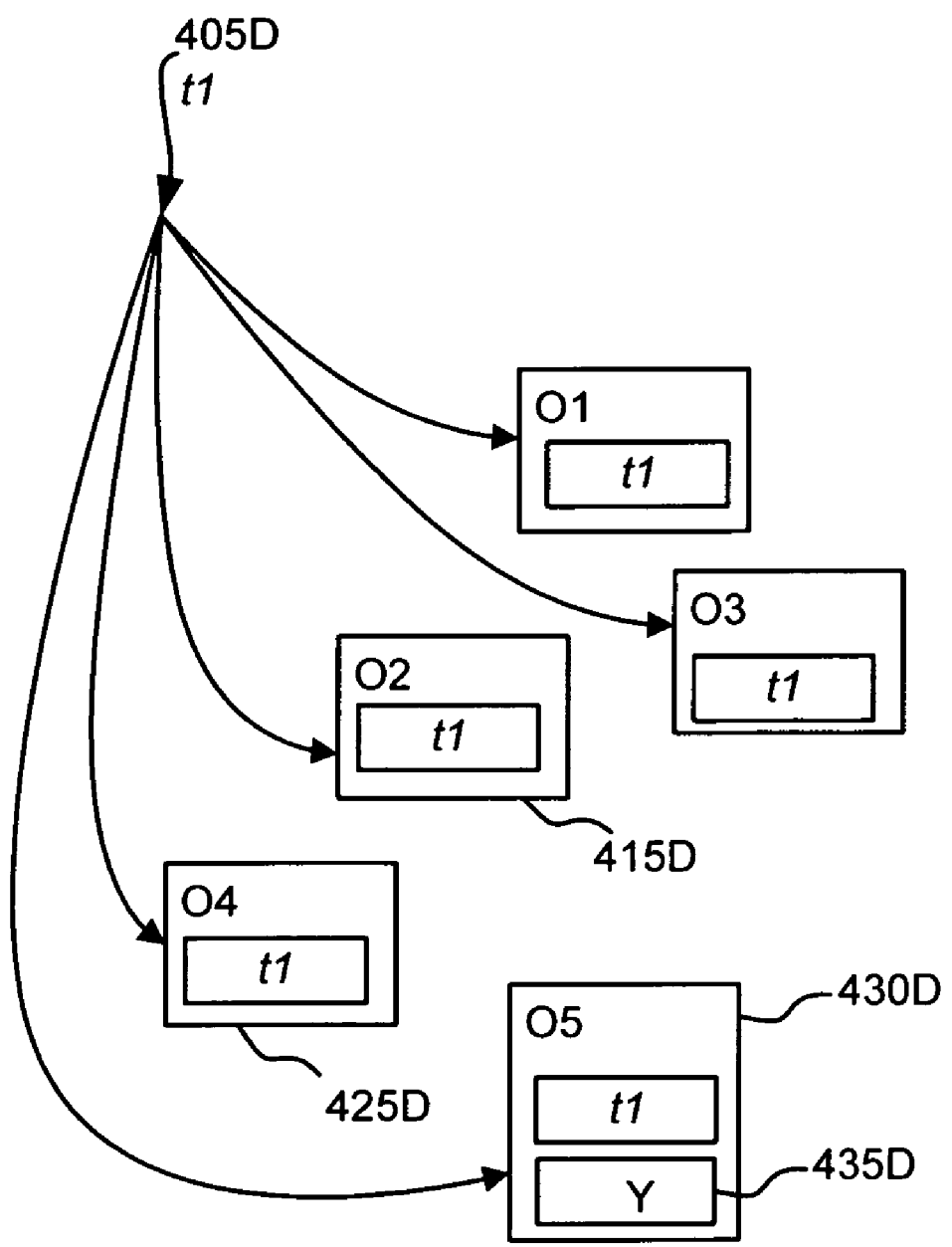
FIG. 4D is a diagram further illustrating an embodiment using an example of an exemplary structure of a hierarchy of objects and a thread which owns all of the objects.

FIG. 4D shows the ownership pattern after t1 at 405D has unpacked O2 at 415D. Now, t1 also owns O2's children, O4 at 425D and O5 at 430D. Thus, t1 can now write O5's Y field value 435D. This demonstrates how the thread t1 can gain access over all of the objects in an object hierarchy by locking only the top object of the hierarchy. For write access to an object, the thread further needs to unpack the object's ancestors and the object itself, but note that in a typical embodiment, unpack operations do not impact the performance of the program, since they serve only to verify the program prior to production use.

Figure 5:
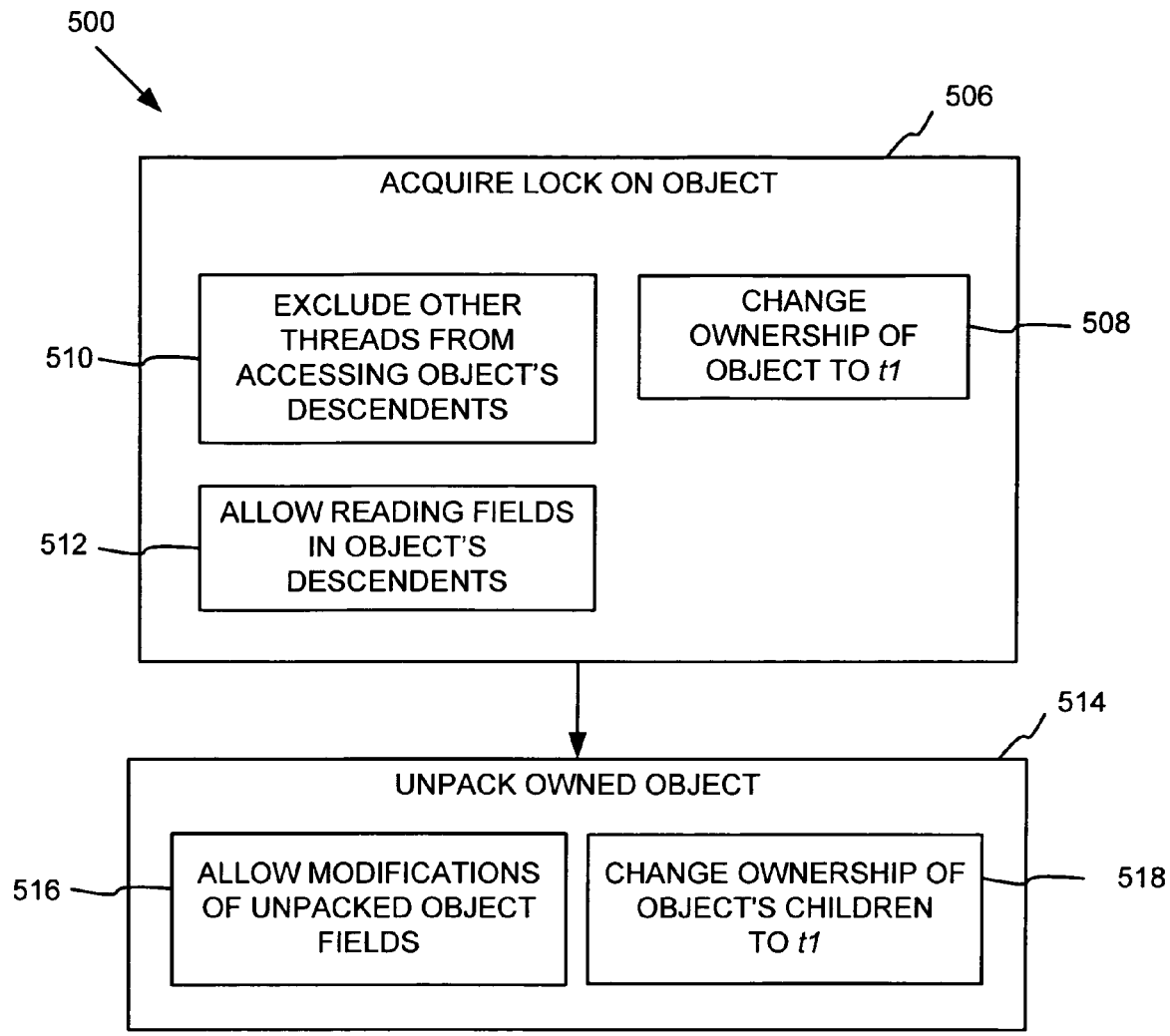
FIG. 5 is a flowchart illustrating an exemplary method for verifying multi-threaded object-oriented programs with invariants.

Referring to FIG. 5 and the code reproduced in FIGS. 6 and 7, flowchart 500 shows a brief overview of the methods disclosed herein. At process block 506, the top object is acquired, which comprises waiting until the object in question is not owned by another thread. At process block 508, the ownership of the object is changed to the accessing thread. In some implementations the lock is placed by changing the ownership of the object to the thread, a one-step process, rather than the two steps illustrated in FIG. 5.

When the object is locked 506, any other threads that may be running are denied access to the locked object and to any descendants of the object, as shown at process block 510. With reference to FIG. 4B, once thread t1 at 405B owns object O1 at 410B, the entire hierarchical structure associated with O1 (objects O2 at 415B through O5 at 430B) can no longer be accessed by any other threads.

At process block 514, thread t1 unpacks the acquired top object; the ownership of any children of the top object is changed to the accessing thread. This ownership confers write access to the accessing thread of any objects that it owns; it can now modify their fields, as shown at process block 516. Ownership of the top hierarchical object grants the owning thread transitive ownership of all of the top hierarchical object's descendants, which allows the accessing thread to read their values, as shown at process block 512.

Turning now to FIG. 6, method Transfer of class Bank 635 has a precondition and a postcondition. The precondition is the requires clause 640, which says that when the Transfer 637 routine begins, neither the from argument nor the to argument can be null, nor can from equal to. The term "tid" should be taken to mean current thread; the phrase "from.owner=tid ^ to.owner=tid" indicates that both the from and the to objects must be owned by the same thread. The postcondition is the ensures clause 645, which states that the bal field in the from object must equal the original from.bal field minus the amount value, and the to.bal field must equal the original to.bal plus the amount value at the end of the procedure. Again, with reference to the code example shown in FIG. 6, method Transfer of class Bank 635 has a precondition 640, which ensures that the class Account 605 instantiation "from" and the class Account 605 instantiation "to" must both have the same thread—the currently executing thread—as their owner. The use of the keyword "tid" is an exemplary embodiment, and other methods of defining the currently-executing thread may be used as envisioned by those of skill in the art.

Figure 3:
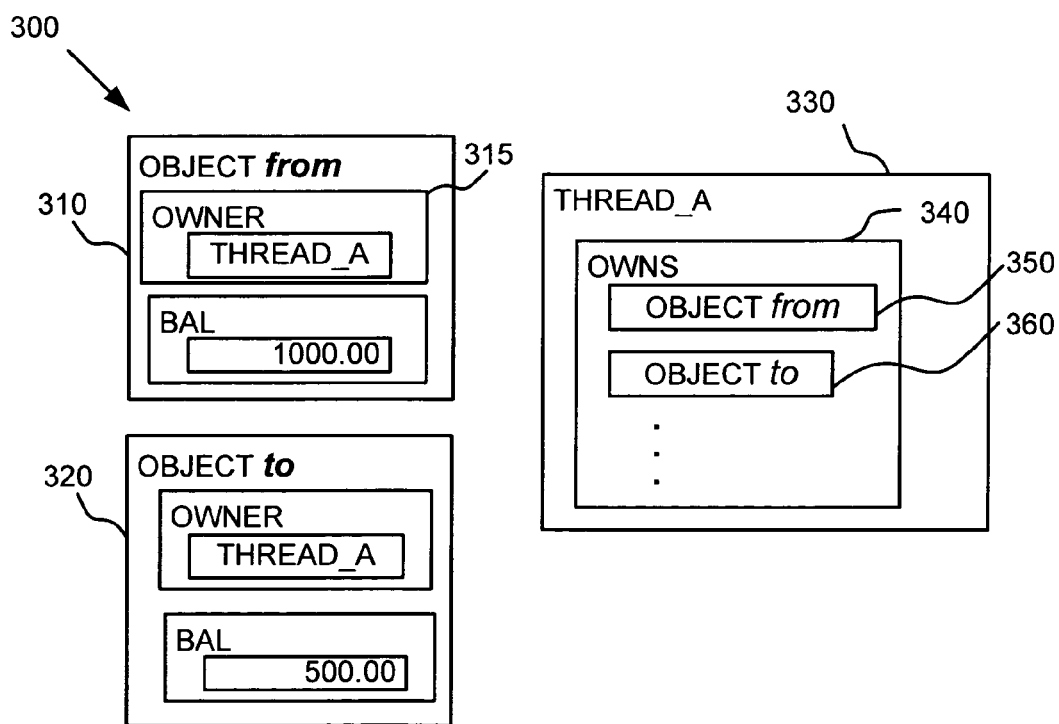
FIG. 3 is a depiction an exemplary embodiment of a thread and two objects.

The exemplary structures shown in FIG. 3 may be used to implement thread ownership of designated objects, as shown in process blocks 508 and 518. These structures 300 represent a particular embodiment that can be used to implement the exemplary methods described above and should not be construed as limiting in any way. Instead, the structure may be modified in arrangement and detail without departing from the scope of the disclosed technology.

Object 310 shows an exemplary embodiment of a portion of object from; it contains an owner field 315 which must hold the same value as the owner field of object t 320. As can be seen, the owner of from and to are both THREAD_A 330. The thread THREAD_A 330 must also have an indication that it owns both objects from 310 and to 320; the table OWNS 340 here does show both from 350 and to 360 being owned by the thread. The table structure 340 can be implemented using a hash table, pointers, a Boolean table, or any other reasonable method known to one of skill in the art.

Once it is verified that the current thread owns all of the designated objects, the body of the routine is performed. It should be noted that specifying a precondition does not cause a thread to acquire the objects mentioned therein, it just ensures that they must be acquired. Furthermore, acquiring an object doesn't change In the code example 600, the body of the routine contains two statements: from.Deposit(−amount) 650, and to.Deposit(amount) 655. These two statements will be executed in turn.

The class Account at 605 in FIG. 6 uses an IntList object 607 (defined in FIG. 7) to represent the history of all deposits ever made to a bank account. A bank account also holds the current balance, which is the same number as the sum of the history, as is captured by the invariant 610.

The Deposit routine 615 includes an postcondition 623, which states that the balance must equal the original balance when entering the routine (old(bal)) plus the amount of the variable passed into the routine (amount) 627. Furthermore, as Deposit 615 is a member of class Account 605, when it is packed it must maintain the invariant $$bal = (\Sigma i | 0 \leq i < hist.count \cdot hist.elems[i]);$$

Deposit 615 includes the precondition "requires inv" 620. The keyword "inv" is a boolean field that specifies whether or not the invariant declared for the object holds. Initially, upon creation of an object, inv is set to false. The statements pack 630 and unpack 625 switch the inv field on and off, respectively; unpack 625, therefore makes the object mutable which allows the object field values to be changed, while pack 630 marks the object as consistent—which prevents further modifications—provided that the new object field values do not violate the invariant. If the invariant is violated, then the program execution is aborted, in an exemplary embodiment by throwing an exception.

The body of Deposit 615 requires that the list hist 607 have an element added. The keyword "rep" in the declaration of hist 607 indicates that the Account object 605 owns the list referenced by hist, which allows the invariant 610 of Account 605 to refer to the fields of hist 607.

DETAILED DESCRIPTION

In the Detailed Description, we introduce the methodology in three stages, each next subsection extending the last one.

Object Invariants.

We consider an object-oriented programming language with classes. Object invariants declare constraints on values that can be stored in the fields of an object. This can be thought of as finer grained type checking, which gives even greater control of possible object field values to a programmer. In addition to invariants, programmers declare preconditions, which list states in which callers can access a specific method, and postconditions, which list states in which the method is allowed to return. Each class can declare invariants which depend on fields of the this object, as seen at 715, and on objects that are owned by the this object, as seen at 610. An object invariant specifies a relation on an object's data that the programmer intends for it to hold.

To allow a program to temporarily violate an object's invariant, each object is given an auxiliary boolean field called "inv", which specifies whether or not the invariant declared for the object holds. An object is mutable if its invariant may temporarily be violated. More formally, an object is consistent if o.inv=true. Thus, all invariants hold for consistent objects. Otherwise, the object is mutable.

In an exemplary embodiment, the inv field can be read in method contracts, that is, in pre- and post-conditions. Examples of precondition usage are shown in FIG. 6 in the Deposit method 615 requires clause 620; and in FIG. 7, in the Add method 720 requires clause 725. The inv field 725 used within the Add method 720 indicates that the IntList object 705 invariant 715 must hold within the Add method 720 body.

The inv boolean field value can only be changed by two special statements, unpack and pack, which delineate the scope in which an object is allowed to enter a state where its invariant does not hold. Unpack sets inv to false, making the object mutable, which allows the invariants to be violated, and also allows object field assignments which might violate the invariant condition. Pack sets inv to true; but before doing so, it checks that the object invariant holds; generating an error condition if it does not.

The class IntList 705 represents an extensible list of integers. The body of IntList requires that the list elems 710 has an element added. The keyword rep in the declaration of elems 710 indicates that IntList 705 owns the list referenced by elems 710. Class IntList 705 does not refer to any fields of the elems array 710. However, ownership serves not only to protect invariants, but also to ensure that representation objects of a composite object o are accessible to a thread t after t unpacks o. That is, if elems 710 were not rep, a thread would not gain ownership of the array as a result of unpacking the IntList object 705.

The rules for maintaining object invariants are as follows:

A new object is initially mutable.

Packing an object takes it from a mutable state to a consistent state, provided its invariant holds.

Unpacking an object takes it from a consistent state to a mutable state.

An object field assignment is allowed only if the target object is mutable.

These rules are formalized as follows, where $Inv_T(o)$ stands for the invariant of class T applied to instance o.

$$pack_T\ o \equiv$$
$$\quad assert\ o \neq null \land \neg o.inv \land Inv_T(o)\ ;$$
$$\quad o.inv \leftarrow true$$
$$unpack_T\ o \equiv$$
$$\quad assert\ o \neq null \land o.inv\ ;$$
$$\quad o.inv \leftarrow false$$
$$o.f := E \equiv$$
$$\quad assert\ o \neq null \land \neg o.inv\ ;$$
$$\quad o.f \leftarrow E$$

In this formalization, an assert statement checks the given condition and aborts program execution, if the condition does not hold.

This methodology guarantees the following program invariant for all reachable states, for each class T:

Program Invariant 0.

$$(\forall o:T\cdot o.inv \Rightarrow Inv_T(o))$$

Here and throughout, quantifications are over non-null allocated objects.

Confinement within Objects.

Accessibility modifiers (such as public and private) in contemporary object-oriented languages cannot, by themselves, guarantee that field variables consistently have only those values that the programmer intended, and are accessed only by those objects that the programmer intended. Using the methods and systems described herein confines objects and the values of the fields within much more strongly.

An aggregate is an object composed from other objects. One piece of an aggregate is known as its part or as a representation object. An aggregate owns its parts. The Account object 605 is an aggregate. Fields holding representation objects are qualified with the rep keyword. More specifically, object ownership, in one exemplary embodiment, is defined through rep fields, which establishes a hierarchy among objects; the this object owning the object referred to by the rep field, and being able to refer to any fields of the owned object. The field hist is defined as a rep field 607. This indicates that an Account object 605 owns its hist object, and can refer to the elements of the hist list.

A part is said to be leaked if it is accessible outside the aggregate. In a sequential setting, but not in a multi-threaded one—leaking is not considered harmful, as long as the parts are leaked only to be read.

Invariants are used to constrain the value space of object data fields. Invariancy and ownership are related as follows: the invariant of an object o can depend only on the fields of o and on the fields of objects reachable from o by dereferencing only rep fields. An invariant itself does not mention any quantification over objects. For example, the Account invariant 610 mentions hist, whose ownership by Account 605 is specified in the Account rep field 607. Similarly, the invariant 715 in the class IntList 705 mentions only the object elems.

To formulate ownership in such a way that invariants are not violated, each object is given an ownership field. Like inv, the owner field cannot be mentioned within the code body of a routine. An object o is free if o.owner=null. An object is considered sealed if it has non-null owner object. The ownership domain of an object o is the set collecting o and all objects that o transitively owns. The rules for pack and unpack enforce that ownership domains are packed and unpacked only according to their order in the ownership hierarchy. Furthermore, pack and unpack change the ownership of representation objects as described by the following rules, which extend the ones given earlier. The function $RepFields_T$ is used to denote the fields marked rep within class T.

$$pack_T\ o \equiv$$
$$\quad assert\ o \neq null \land \neg o.inv \land Inv_T(o)\ ;$$
$$\quad foreach\ (f \in RepFields_T\ where\ o.f \neq null)$$
$$\quad\quad \{\ assert\ o.f.inv \land o.f.owner = null\ ;\ \}$$
$$\quad foreach\ (f \in RepFields_T\ where\ o.f \neq null)$$
$$\quad\quad \{\ o.f.owner \leftarrow o\ ;\ \}$$
$$\quad o.inv \leftarrow true$$
$$unpack_T\ o \equiv$$
$$\quad assert\ o \neq null \land o.inv \land o.owner = null;$$
$$\quad o.inv \leftarrow false\ ;$$
$$\quad foreach\ (f \in RepFields_T\ where\ o.f \neq null)$$
$$\quad\quad \{\ o.f.owner \leftarrow null\ ;\ \}$$

With continuing reference to FIGS. 6 and 7, a trace of the invocation acct.Deposit 600 for a non-null Account object acct is provided that satisfies the precondition of Deposit (the requires clause 620). This discussion focuses only on the involved inv and owner fields of the involved objects.

1. Deposit 615 unpacks acct 625, which makes acct 625 mutable; hist 627 is made free.
2. Add 720 is called; hist is unpacked 730 which makes it mutable.
3. The body of Add 735, 740 is performed, changing the values in elems 735 and count 740; they are allowed to temporarily violate the invariant.
4. hist is packed 745; during the packing operation this entails checking the invariant of hist 715. If hist violates the invariant, then an error is thrown. If it does not violate the invariant, then the packing operation is successfully completed, and hist is made consistent.
5. The Deposit method 615 packs acct 630: the invariant of acct is checked 623, acct is made consistent, and hist is sealed.

Generalizing from this example, it can be observed that the methodology ensures the following program invariant, for each class T:

Program Invariant 1.

$$(\forall o:T\cdot o.inv \Rightarrow Inv_T(o))\land$$
$$(\forall f\in RepFields_T,o:T\cdot$$
$$\quad o.inv \Rightarrow o.f = null \lor o.f.owner = o)\land$$
$$(\forall o:T\cdot o.owner \neq null \Rightarrow o.inv)$$

Confinement Within Threads.

An object can either be free, it can be owned by an aggregate object, or it can be owned by a thread. Correspondingly, the owner field of an object can either be null, an object, or a thread. In some languages, such as Java and C#, a thread has a representation as an object; ambiguity can be avoided in these languages by requiring that thread objects have no rep fields; thus, when a thread object appears as an owner, it denotes the thread, not the object.

Sequential reasoning techniques significantly simplify both formal and informal reasoning about program correctness. To support sequential reasoning about field accesses, a thread must have exclusive access to the fields during the execution of the program fragment to which the sequential reasoning applies. A thread must transitively own an object whenever it reads one of its fields. A thread must directly own an object to write one of the object's fields. Since no two threads can (transitively) own the same object concurrently, this guarantees exclusion.

The rules for pack and unpack enforce that ownership domains are packed and unpacked strictly according to their order in the ownership hierarchy. Furthermore, pack and unpack change the ownership of parts (representation objects) as described by the following rules:

The rules for thread ownership are as follows:

A thread owns any object it creates.

A new object is initially mutable.

A thread can attempt to acquire any object. This is often done using an acquire statement. This operation will block until the object is free. When the object is free, the object is consistent. At this point, the thread gains ownership.

A thread can relinquish ownership of a consistent object, but not of a mutable object. This can be performed using a release statement.

A thread that owns a consistent aggregate object can gain ownership of its sealed representation objects by unpacking the aggregate object. In an exemplary embodiment, this is done using the unpack statement. This transfers ownership of the representation objects from the aggregate object to the thread.

A thread can, using a pack statement (in certain embodiments), transfer ownership of a consistent object that it owns to an aggregate object.

A thread can perform a field assignment only if it owns the target object and the target object is mutable.

A thread can read a field only if it transitively owns the target object. In an exemplary embodiment, a slightly stricter rule is used: a thread can evaluate an access expression $o.f_1 \ldots .f_n.g$ only if it owns o and each object in the sequence $o.f_1 \ldots .f_n$ owns the next object in the list.

Figure 8:
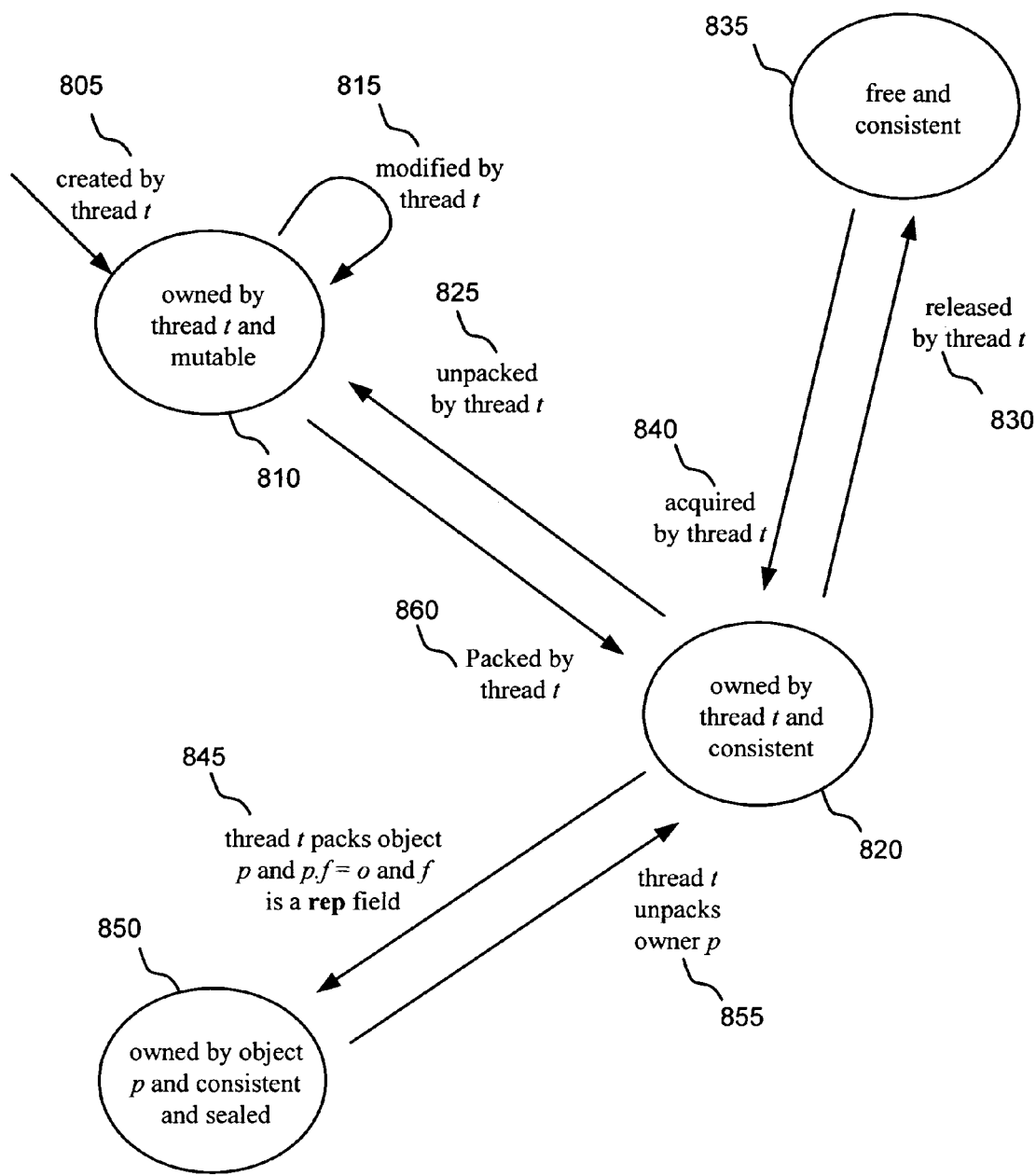
FIG. 8 is a depiction of a lifecycle of an object created using the methods depicted herein.

These rules give rise to the object lifecycle shown in FIG. 8. An object is first created 805 by a thread t. When first created, it is owned by the thread t that created it, and it is mutable 810. In this stage it can be modified by thread t 815 without further ado. The thread that created the object, t, can now pack it 860, which will not change its ownership—it is still owned by thread t—but now it is consistent, and therefore cannot be modified, even by t. Should t wish to modify the object, it must be unpacked 825. When owned by t and consistent 820, the object can be released by t 830, in which case the object is free and consistent 835. Thread t can acquire a free object 840, which again makes it owned by t and still consistent 820.

For an object o, if thread t packs an object p and $p.f=o$, and $f$ is declared as a rep field 845, then the object o's ownership changes top, the object o stays consistent, but is now sealed 850. An example of this can be found in FIG. 6 at 630, where Deposit packs acct: acct is made consistent, and hist—which was made consistent when the Add method was packed 745—is sealed. When the owner p is unpacked by a thread t 855, the owned object o remains consistent, but its ownership moves to thread t 820.

Fully spelled out, these rules are formalized as follows, with the following comments—recall that the currently-executing thread is denoted "tid":

$$\begin{aligned}
&\text{pack}_T \, o \equiv \\
&\quad \text{assert } o \neq \text{null} \wedge o.\text{owner} = \text{tid} \wedge \neg o.\text{inv} ; \\
&\quad \text{foreach } (f \in \text{RepFields}_T \text{ where } o.f \neq \text{null}) \\
&\quad\quad \{\text{assert } o.f.\text{owner} = \text{tid} \wedge o.f.\text{inv} ; \} \\
&\quad \text{foreach } (f \in \text{RepFields}_T \text{ where } o.f \neq \text{null}) \\
&\quad\quad \{o.f.\text{owner} \leftarrow o ; \} \\
&\quad \text{assert } \text{Legal}[\text{Inv}_T(o)] \wedge \text{Inv}_T(o) ; \\
&\quad o.\text{inv} \leftarrow \text{true} \\
&\text{unpack}_T \, o \equiv \\
&\quad \text{assert } o \neq \text{null} \wedge o.\text{owner} = \text{tid} \wedge o.\text{inv} ; \\
&\quad o.\text{inv} \leftarrow \text{false} ; \\
&\quad \text{foreach } (f \in \text{RepFields}_\tau \text{ where } o.f \neq \text{null}) \\
&\quad\quad \{o.f.\text{owner} \leftarrow \text{tid} ; \} \\
&\text{acquire } o \equiv \\
&\quad \text{assert } o \neq \text{null} \wedge o.\text{owner} \neq \text{tid} ; \\
&\quad \text{await } (o.\text{owner} = \text{null}) \, \{o.\text{owner} \leftarrow \text{tid} ; \} \\
&\text{release } o \equiv \\
&\quad \text{assert } o \neq \text{null} \wedge o.\text{owner} = \text{tid} \wedge o.\text{inv} ; \\
&\quad o.\text{owner} \leftarrow \text{null} \\
&o.f := v \equiv \\
&\quad \text{assert } o \neq \text{null} \wedge o.\text{owner} = \text{tid} \wedge \neg o.\text{inv} ; \\
&\quad o.f \leftarrow v \\
&x := E \equiv \\
&\quad \text{assert } \text{Legal}[[E]] ; \\
&\quad x \leftarrow E ;
\end{aligned}$$

In the above formalization, Legal[E] is written to denote the predicate which indicates that every object accessed in E is transitively owned by the current thread. In particular:

$$\begin{aligned}
&\text{Legal}[x] \equiv \text{true} \\
&\text{Legal}[E_o \, \text{op} E_1] \equiv \text{Legal}[E_o] \wedge \text{Legal}[E_1] \\
&\text{Legal}[o.f_1 \ldots .f_n.g] \equiv \\
&\quad o.\text{owner} = \text{tid} \wedge \\
&\quad o.f_1.\text{owner} = o \wedge \\
&\quad \ldots \wedge \\
&\quad\quad o.f_1 \ldots .f_n.\text{owner} = o.f_1 \ldots .f_n - 1
\end{aligned}$$

When a thread attempts to execute a statement await (P) {S}, it blocks until the condition P is true, at which point the statement S is executed; the evaluation of P that finds P to be true and the execution of S are performed as one indivisible action.

The example Bank class previously encountered in FIGS. 6 and 7 is now extended with a Transaction method 900, which allows transfers between different accounts, as shown in FIG. 9. The method Transfer 905 has a precondition 910 which requires that the from and to accounts are owned by the same thread. If the precondition holds, Transfer 905 executes without blocking. The method Transaction 930 performs the same bank account transfer, but has no requirement on thread ownership. Therefore, Transaction 930 acquires the from and to objects, and both acquire operations might block.

Note that method Transfer 905 declares a postcondition 915, whereas method Transaction 930 does not. In fact, Transaction 930 cannot ensure the same postcondition as Transfer 905 as other threads might intervene between the first release 935 and the second 940, or might intervene immediately after the second release but before the calling routine resumes. For method Transfer 905, on the other hand, the postcondition 915 is stable, since the calling thread owns the account objects, which affords it exclusive access.

This methodology ensures the following program invariant, for each class T:

Program Invariant 2.

$$(\forall o : T \bullet o.inv \Rightarrow Inv_T(o)) \quad (0)$$
$$(\forall f \in RepFields_T, o : T \bullet$$
$$o.inv \Rightarrow o.f = null \lor o.f.owner = o) \quad (1)$$
$$(\forall o : T \bullet o.owner \notin thread \Rightarrow o.inv) \quad (2)$$

Soundness

In this section, two results are proven for the methodology. First, there are no dataraces. Second, if an object is consistent, its invariant holds.

A datarace occurs when a field is accessed concurrently by two threads and at least one of the threads is performing a write to the field. If a data race occurs, the values read or written by a thread may be unpredictable, which severely complicates reasoning about the program.

Dataraces are eliminated in this methodology by introducing redundant thread-local data into the program state, as follows:

With each thread t is associated a thread-local table owns, which maps object references to booleans.

The semantics of all statements that perform updates on owner fields are extended so that they also update the current thread's owns table. These updates will maintain the following invariant, for any object o and thread t:

$$t.owns[o] \Rightarrow o.owner = t$$

The semantics of all statements whose preconditions require o.owner=tid for some o are modified, so that these preconditions instead require tid.owns[o].

Any write to the owner field of an object is assumed to be an indivisible action.

With these modifications, the following lemma and theorem can now be proven:

LEMMA 0. The methodology guarantees that (1) holds in all reachable states.

THEOREM 1 (RACE FREEDOM). Consider any object o in an execution of a program. If t is a thread that transitively owns o, then t is the only thread that can read or write a field of o or change the transitive ownership of o. Furthermore, if the transitive owner of o is null, then the only field of o that a thread reads or writes is o.owner, and the thread reads and writes o.owner only at a moment when o.owner=null.

Lemma 0 and Theorem 1 are proven together:

PROOF. Consider an arbitrary execution of the program. We prove by induction that the required properties hold in every prefix of the execution.

We look at our formalization of each program construct, as given in the previous section. Except for the unpack and acquire statement, these rules guarantee that each read or write of a field $o.f_1 \ldots .f_n.g$ is protected by an expression equivalent to the expansion of Legal[$o.f_1. \ldots .f_n.g$] (we assume the evaluation of $\wedge$ to be conditional—and). By the induction hypothesis, these conditions are stable (with respect to the execution of other threads).

This property is also guaranteed for the unpack statement, except for its update of $o.f.owner$. Here, the lemma is required. By the inductive hypothesis of the lemma, we have the disjunction $o.f=null \lor o.f.owner=o$ immediately after checking o.inv. By the inductive hypothesis of the theorem, this disjunction is stable. Therefore, $o.f.owner=o$ holds inside the foreach loop (unless a previous iteration of the foreach loop has already assigned tid to $o.f.owner$, which is also okay; this situation arises if o has two rep fields referencing the same part).

For the acquire statement, the reading and writing of o.owner happens at a time when o.owner=null, as required by the theorem.

For the lemma, (1) holds in the empty prefix of the execution, since no objects are yet allocated, which means the quantifications are vacuously true. We now turn to nonempty prefixes of the execution.

Condition (1) can be violated if the quantifier's range is enlarged to a newly allocated object. But new objects are initially mutable, so (1) is maintained.

Condition (1) can be violated if an inv field is set to true, which happens only in the pack statement. There, the update of o.inv is preceded by assignments to $o.f.owner$ for representation fields $o.f$. By the theorem, the effect of these assignments is stable, and thus, pack maintains (1).

Condition (1) can also be violated if a representation field $o.f$ is changed to a non-null value when o.inv holds. But only the field update statement writes to fields, and its update is protected by $\neg o.inv$, which by the theorem is stable.

Finally, condition (1) can be violated if p.owner is changed to a value q, when there is an object r and representation field g such that $$r \neq q \wedge r.inv \wedge r.g = p$$

for then, after the assignment, we would have $$r.inv \wedge r.g \neq null \wedge r.g.owner = q$$

The assignment to $o.f.owner$ in the pack statement is valid, because we argue that there are no r and g such that $r.g = o.f \wedge r.inv$: For a contradiction, suppose there are such an r and g. Then, by the induction hypothesis of (1), $r.g=null \lor r.g.owner=r$. It cannot be r.g=null, because $o.f \neq null$. And it cannot be r.g.owner=r, because the pack statement checks $o.f.owner$ to be a thread, not the object r.

The unpack statement changes $o.f.owner$, so we again argue that there are no r and g such that $r.g=o.f \wedge r.inv$. At the time the unpack statement checks o.inv, the induction hypothesis of (1) tells us that $o.f=null \lor o.f.owner=o$ for all representation fields $f$. The update of $o.f.owner$ happens only if $o.f \neq null$, so if $o.f.owner$ is updated, then $o.f.owner$ starts off as o. So the only r in danger is o itself. But at the time of the update of $o.f.owner$, o.inv is false.

The acquire statement changes o.owner, but does so from a state where o.owner is null.

The release statement changes o.owner, but does so from a state where o.owner is a thread, not an object.

Because of Theorem 1, we no longer have to argue about race conditions. That is, in the proof of the Soundness Theorem below, we can assume values to be stable.

THEOREM 2 (SOUNDNESS). The methodology guarantees that Program Invariant 2 holds in all reachable states.

PROOF. Lemma 0 already proves (1), so it remains to prove (0) and (2).

Consider an arbitrary execution of the program. We prove by induction that Program Invariant 2 holds in every prefix of the execution.

Program Invariant 2 holds in the empty prefix of the execution, since no objects are allocated then, which means the quantifications are vacuously true.

Consider any prefix of the execution leading to a state in which Program Invariant 2 holds. Let t be the thread that is about to execute the next atomic action. We prove by case analysis that this action maintains Program Invariant 2. In all cases, we make use of the fact that the owner field is not mentioned in invariants.

Case creation of a new object o. This operation affects only quantifications over objects, since the operation enlarges the range of such quantifications. Since o.owner=t and ▬o.inv, and since for all p, $Inv_T(p)$ does not mention quantifications over objects, all conditions are trivially satisfied.

Case pack $_T$o. (0) and (2) follow directly from the semantics.

Case unpack $_T$o. (0) and (2) follow directly from the semantics.

Case acquire o. (0) is vacuously maintained. (2) follows directly from the semantics.

Case release o. (0) is vacuously maintained. (2) follows directly from the semantics.

Case o.$f$:=v. (2) is vacuously maintained. We prove the maintenance of (0) for an arbitrary object p of a type T. Suppose for a contradiction that p.inv holds and that $Inv_T(p)$ depends on o.$f$. Then o must be reachable from p via non-null rep fields. Through repeated application of (1) and (2), we obtain that o.inv holds. This contradicts the action's precondition, which incorporates ¬o.inv.

This concludes the proof.

Having proved the Soundness Theorem, we can simplify the definition of Legal. In particular, we only need to check that the current thread owns the root object of an access expression and that all fields in the intermediate dereferences in the access expression are rep fields:

Legal[o.$f_1$. ... .$f_n$ .g] ≡
   o.owner = tid
   and $f_1$, ..., $f_n$ are all rep fields,
   and for each i < n, o.$f_1$...$f_i$ is consistent (i.e. n=0 or o is consistent).

Program invariant (1) takes care of the rest.

The soundness proof assumes an interleaving semantics. This implies that memory accesses are sequentially consistent. Sequential consistency means that there is a total order on all memory accesses, such that each read action yields the value written by the last write action.

Since Theorem (1) proves the absence of dataraces, this Soundness Theorem is relevant even in many systems with a weaker memory model, provided a happens-before edge exists between writing the owner field in the release statement and reading the owner field in the acquire statement.

Static Verification

This Soundness Theorem proves three properties that hold in every reachable state. These properties can therefore be assumed by a static program verifier at any point in the program.

By Theorem (1), we know that the values read by a thread are stable with respect to other threads. That is, as long as an object remains in the thread's ownership domain, the fields of the object are controlled exactly in the same way that fields of objects are controlled in a sequential program. Therefore, static verification proceeds as for a sequential program.

For objects outside the thread's ownership domain, stability cannot be guaranteed, as we alluded to in the discussion of the Transaction method in FIG. 9. Specifically, as the Transaction 930 method does not require thread ownership, the objects used by this method 930 are not owned by the executing thread until the objects are explicitly acquired. But since a thread cannot read the fields of such objects (Theorem 1), static verification is unaffected by the values of those fields.

When an object o enters a thread's ownership domain, we know that the invariants of all objects in o's ownership domain hold. In particular, due to our non-reentrant acquire statement and program invariant (2) of the Soundness Theorem, we have o.inv. To model the intervention of other threads between exclusive regions, a static verifier plays havoc on the fields of all objects in o's ownership domain after each acquire o operation. The static verifier can then assume o.inv. By repeated applications of program invariants (1) and (2), the verifier infers p.inv for all other objects p in the ownership domain of o. Thus, by program invariant (0), the verifier infers that the invariants of all of these objects hold.

To check our methodology at run time, we only need to check the assertions prescribed in the Confinement Within Threads section, above. However, to reason modularly about a program, as in static modular verification, method contracts should also be used. We have already seen examples of pre- and postconditions, but method contracts also need to include modifies clauses, which frame the possible effects a method can have within the thread's ownership domain.

Safe Concurrency in Java and C#

This methodology uses acquire and release as synchronization primitives. But how, if at all, does this apply to the synchronized statement of Java, or, equivalently, C#'s lock statement, neither of which explicitly include a release statement. One might think that it would suffice to map Java's synchronized statement to acquire and release statements as follows:

[[synchronized (o) { S } ]] =
   acquire o ;
   try { S } finally { release o ; }

Unfortunately, this approach is incorrect. Specifically, entering a synchronized statement is not semantically equivalent to the acquire statement because Java considers an object to be initially not owned, whereas our methodology considers an object to be initially owned by the thread that creates it. This manifests itself in the following specific behavior: in Java, the first thread that attempts to enter a synchronized statement always succeeds immediately; in our methodology, a release operation must occur on an object before any thread can successfully acquire it, even the first time, as the invariants must be set prior to the first acquisition.

Additionally, in this approach, there is no syntax for an object's initial release operation; as a result, an object could never become free. One might suggest having an implicit release operation when an object is created, and requiring even the creating thread to synchronize on the object, even in the object's constructor. But this is problematic, since it would not give the creating thread a chance to establish the object's invariant before it is released.

But there are at least two ways to achieve a correct mapping between our methodology and Java and C#. The first consists of implementing acquire and release methods on top of the language's built-in primitives. An example implementation of such acquire and release code in Java is shown in FIG. 10. With this implementation, acquiring an object o would correspond to calling the acquire method of the AcqRel object associated with object o. The latter association could be achieved using e.g. a hash table, or, depending on platform constraints, more efficient methods, such as merging the AcqRel class into class Object.

The second way to apply our methodology to Java and C#, is by modifying the methodology. Specifically, a modified methodology exists such that executing an acquire or release statement on an object corresponds exactly with entering or exiting a synchronized statement that synchronizes on the object. The modification involves the introduction of an additional boolean field, called shared, in each object. The field is initially ƒalse, it can be mentioned only in method contracts, and it can be updated only through a special share statement.

In the modified methodology, the semantics of the statements acquire, release, and share are as follows:

```
acquire o ≡
    assert o ≠ null ∧o.shared ∧o.owner ≠ tid ;
    await (o.owner = null) { o.owner ←tid ; }
release o ≡
    assert o ≠ null ∧o.owner = tid ∧o.shared ∧o.inv ;
    o.owner ←null
share o ≡
    assert o ≠ null ∧o.owner = tid ∧¬o.shared ∧o.inv ;
    o.owner ←null ;
    o.shared ←true
```

In the modified methodology, exclusive access to an object by its creating thread during initialization is ensured not through runtime synchronization, but through constraints on the newly-introduced shared field imposed by the methodology.

Runtime Checking.

This methodology supports both static verification and run-time checking. The advantage of static verification is that it decides the correctness of the program for all possible executions, whereas run-time checking decides whether the running execution complies with the methodology. The disadvantage of static verification is that it requires method contracts, including preconditions, postconditions, and modifies clauses, whereas run-time checking does not.

If a program has been found to be correct through static verification, no run-time checks would ever fail and they can be omitted. When running a program without run-time checks, the only run-time cost imposed by our methodology is the implementation of the acquire and release statements (as in FIG. 10, for example); none of the fields or other data structures introduced by our methodology need to be present, and none of the assert statements need to be executed. In particular, the pack and unpack statements become no-ops.

For run-time checking, two fields, the inv field and the owner field, need to be inserted into each object. To prove race freedom, we eliminated the races on the owner fields by introducing an owns table for each thread; however, on most platforms, including Java and C#, these races are in fact benign and the owns tables can be omitted.

Exemplary System Embodiment

Figure 11:
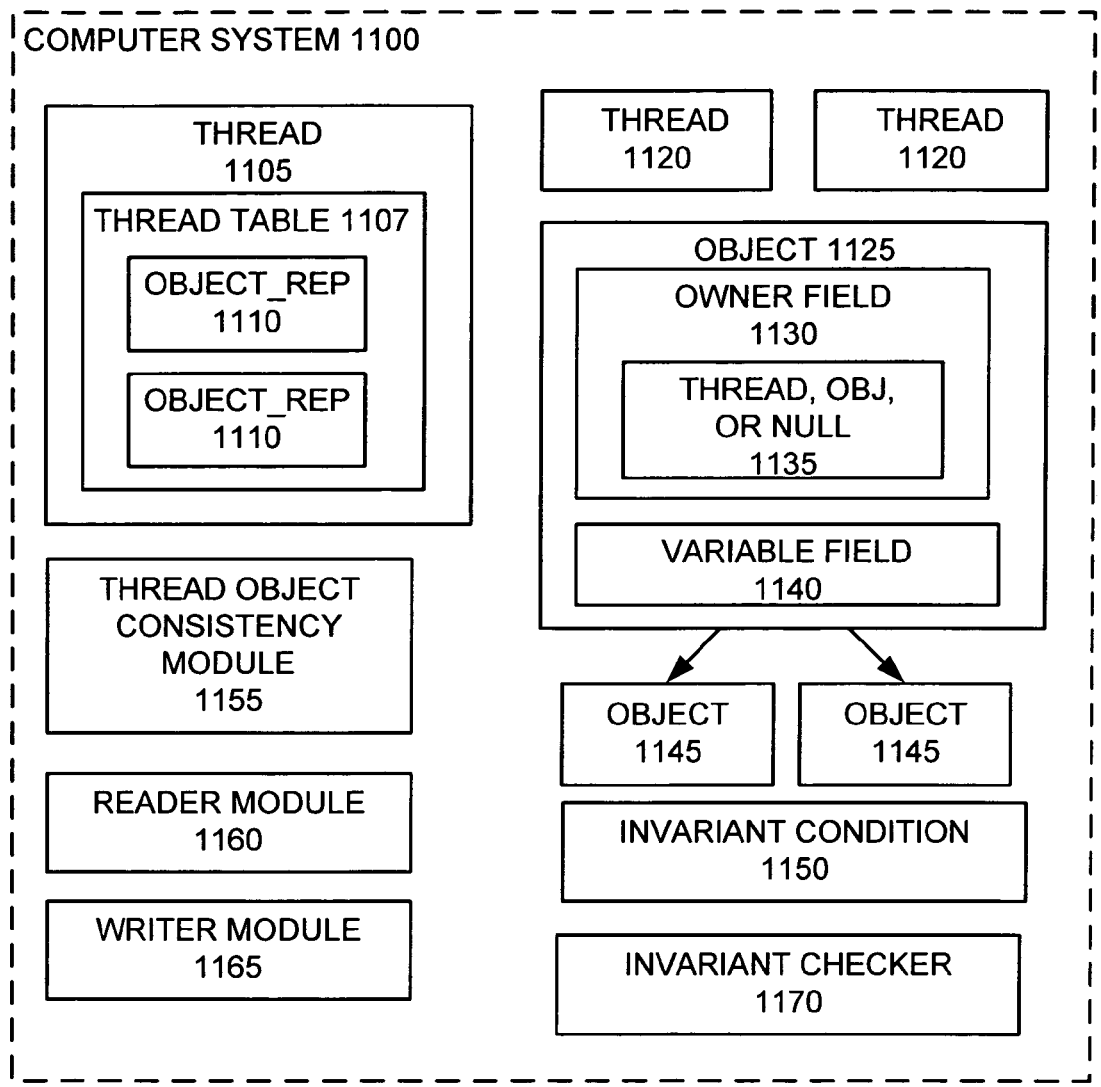
FIG. 11 is a block diagram of a computer system that can be used to implement ensuring that invariants are maintained in a multi-threaded environment.

FIG. 11 illustrates another exemplary embodiment of a computer system 1100 that can be used to implement a system for maintaining object invariants. The computer system 1100 has a thread 1105. This thread 1105 contains a thread table that is used to store representations 1110 of the identities of the objects which the thread owns. The computer system 1100 also contains other threads 1120, each with their own thread table (not shown). It also contains objects 1125, 1145, which may be hierarchically arranged. The arrangement shown is that of a top hierarchy object 1125 with two children 1145. Many other arrangements are possible. The objects themselves 1125, 1145 contain an owner field 1130 which may hold one of three values: a value that is equivalent to a representation of a thread that owns the object; a value that is a representation of the identity of another object which owns the object, or the value null or an equivalent 1135. The objects may also contain one or more variable fields 1140. Although one variable field 1140 is shown, it should be understood that one, two, or more fields are all within the scope of the embodiment. Block 1150 shows an invariant condition, which gives legal values that a specified object variable may hold. Invariant conditions may specify a single object variable, or may specify two or more object variables within their conditions.

The computer system 1100 further comprises a thread—object consistency module 1155. The purpose of this module is to ensure that the thread table 1107 for a thread 1105 correctly records each object that the thread owns while ensuring that each owned object has an indication of which thread owns it in its owner field 1130.

An optional reader module 1160 is also included which reads an object variable field if the object is transitively owned by the thread requesting read access. A writer module 1165 is also included. This writes a value into the object variable field if the object is owned by the thread requesting write access. The system further comprises an invariant checker 1170, which ensures that the object variable field contains the invariant condition legal values, and which is called after the reader module or the writer module is accessed by a thread for a given object. If the invariant condition is found to hold illegal values, then in an exemplary embodiment an exception is thrown.

Conclusions

This locking methodology helps in defining leak-proof ownership domains. Several aspects of this new approach are noteworthy. First, sequentially verifiable programs are race free. Due to the necessary preconditions for reading and writing, only one thread at a time can access the objects of an ownership domain. Second, the owner of an object can change over time. In particular, an object may move between ownership domains. Third, our methodology can be efficient; it acquires only one lock per ownership domain, where the domain consists of many objects. Further, at run time, we only need to keep track of a bit per object that says whether or not there exists a thread that transitively owns the object.

Other Alternatives

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. For example, the technologies described herein may be applied to any static or run-time program verifier.

Various types of general purpose or specialized computing environments may be used with or perform operations in accordance with the teachings described herein. Elements of embodiments shown in software may be implemented in hardware and vice versa. Various types of general-purpose or specialized computers may be used to perform the systems and methods disclosed herein. Furthermore, actions described herein can be achieved by computer-readable media comprising computer-executable instructions for performing such actions.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method comprising:

executing multiple threads on a computer;

a thread T1 acquiring a lock on a top object in a hierarchy of objects, wherein an invariant condition is specified for the top object, the invariant condition specifies a relation on data of the top object, and the invariant condition references at least two fields, wherein the at least two fields are of at least two different objects;

wherein acquiring the lock changes ownership to thread T1 of the top object;

wherein ownership confers upon thread T1 a right to modify any field of the top object;

wherein the lock excludes all other threads from accessing the top object and any descendant objects in the hierarchy of objects;

after acquiring the lock, unpacking the top object, wherein unpacking the top object comprises designating the top object as being of a mutable state, which allows invariants to be temporarily violated and allows field assignments of the top object that temporarily violate the invariant condition; and packing the top object, wherein packing the top object comprises verifying that the invariant condition holds and taking the top object from the mutable state to designated as being of a consistent state, wherein being designated as being of a consistent state prevents further modifications.

2. The method of claim 1 wherein each object in the hierarchy of objects is owned by a thread, is owned by an object, or is free.

3. The method of claim 1, wherein at least one modified object field temporarily violates the invariant condition.

4. The method of claim 1, wherein if thread T1 owns the top object of an object hierarchy then thread T1 transitively owns all descendants of the top object and wherein if thread T1 transitively owns a descendant object then allowing the thread T1 to read at least one object field from at least one descendant object.

5. The method of claim 1, wherein the thread Tl gains ownership of a descendent object O1 directly owned by another object O2 by unpacking O2.

6. The method of claim 1, wherein thread T1 can gain ownership of any descendent object O1 directly owned by another object O2 when thread T1 owns object O2.

7. The method of claim 1, wherein at least one object O1 has an owner field, and each time a thread T1 gains ownership of the object O1, the owner field is updated with a representation of the thread T1; and wherein the thread T1 has an owns field and the owns field of thread T1 is updated with a representation of the object O1 with the owner field of O1 being updated.

8. The method of claim 1, wherein:

a program defines the hierarchy of objects; and the program is verified using one of static verification, model checking, or run-time checking.

9. The method of claim 1, further comprising an object being created by a thread;

the object initially being owned by the thread that created it;

the object being released prior to a subsequent thread gaining ownership of the object;

wherein prior to the object being released, the invariant condition is established.

10. The method of claim 1 wherein:

packing the top object comprises:

checking that the invariant condition holds; and generating an error condition if the invariant condition does not hold.

11. A computer-readable storage medium storing computer-executable instructions for causing a computer system to perform the method of claim 1.

12. A computer system having a multi-threaded operating system, the computer system comprising:

one or more processing units;

memory;

at least one thread with a thread table for determining object ownership;

at least two objects hierarchically arranged, at least one object further comprising:

an owner field for determining an entity that owns the at least one object; and at least one variable field;

a thread-object consistency module which ensures that for each thread-object transition, the thread table indicates that a thread owns the at least one object and the owner field indicates that the at least one object is owned by the thread;

a writer module which writes a value into the variable field if the at least one object is owned by a thread requesting write access;

a representation of an invariant condition specified for a top object of the at least two objects, wherein the invariant condition specifies a relation on data of the top object, and the invariant condition references at least two fields, wherein the at least two fields are in at least two different objects;

a variable indicating whether the invariant condition holds;

wherein an unpack statement switches the variable off and designates the top object as being of a mutable state, which allows invariants to be temporarily violated and allows field assignments of the top object that temporarily violate the invariant condition; and wherein a pack statement switches the variable on, verifies that the invariant condition holds, and takes the top object from the mutable state to designated as being of a consistent state, wherein being designated as being of a consistent state prevents further modifications.

13. The computer system of claim 12, further comprising a reader module which reads an object if the object is owned by a thread requesting read access.

14. The computer system of claim 13, further comprising an invariant checker, which ensures that the at least one object variable field contains the legal values for the object invariant condition, and which is called after the writer module is accessed for a given object.

15. A method comprising:

executing multiple threads on a computer;

a thread T1 acquiring a lock on an object in a hierarchy of objects, wherein an invariant condition is specified for the object, and the invariant condition specifies a relation on data of the top object, and the invariant condition comprises legal values for at least two fields in two different objects;

wherein acquiring the lock changes ownership to thread T1 of the object;

wherein ownership confers upon thread T1 rights to modify any field of the object;

wherein the lock excludes other threads from accessing the object and any descendant objects in the hierarchy of objects;

after acquiring the lock, unpacking the object, wherein unpacking the object comprises designating the object as being of a mutable state, which allows invariants to be temporarily violated and temporarily allows field assignments of the object that violate the invariant condition;

packing the object, wherein packing the object comprises (a)-(b):

(a) checking whether the invariant condition holds;

(b) choosing between taking the object from the mutable state to a consistent state, provided the invariant condition holds and generating an error condition if the invariant condition does not hold; and wherein the hierarchy of objects is defined via a definition comprising a keyword specifying object ownership of one or more fields; and wherein being designated as being of a consistent state prevents further modifications.

* * * * *